United States Patent
Lewis et al.

(10) Patent No.: US 9,653,072 B2
(45) Date of Patent: *May 16, 2017

(54) APPARATUS AND METHOD FOR FORMING SEARCH ENGINE QUERIES BASED ON SPOKEN UTTERANCES

(71) Applicant: Nuance Communications, Inc., Burlington, MA (US)

(72) Inventors: Steven Hart Lewis, Middletown, NJ (US); Kenneth H. Rosen, Middletown, NJ (US)

(73) Assignee: Nuance Communications, Inc., Burlington, MA (US)

(*) Notice: Subject to any disclaimer, the term of this patent is extended or adjusted under 35 U.S.C. 154(b) by 301 days.

This patent is subject to a terminal disclaimer.

(21) Appl. No.: 14/299,761

(22) Filed: Jun. 9, 2014

(65) Prior Publication Data

US 2014/0288935 A1 Sep. 25, 2014

Related U.S. Application Data

(63) Continuation of application No. 11/128,564, filed on May 13, 2005, now Pat. No. 8,751,240.

(51) Int. Cl.
*G10L 15/00* (2013.01)
*H04M 3/00* (2006.01)
(Continued)

(52) U.S. Cl.
CPC ...... *G10L 15/1815* (2013.01); *G10L 15/1822* (2013.01); *H04M 3/493* (2013.01)

(58) Field of Classification Search
CPC ......... G10L 15/00; G10L 15/02; G10L 15/04; G10L 15/018; G10L 15/1815; G10L 15/1822; G10L 15/22; G10L 15/26; G10L 15/265; G10L 15/30; G10L 2015/22; G10L 2015/223; G10L 2015/225; G06F 3/16; G06F 17/20; G06F 17/21; G06F 17/27;
(Continued)

(56) References Cited

U.S. PATENT DOCUMENTS 6,243,684 B1 6/2001 Stuart et al.
6,618,726 B1 9/2003 Colbath et al.
(Continued)

FOREIGN PATENT DOCUMENTS

EP 0 859 500 8/1998
EP 1 094 406 4/2001
(Continued)

OTHER PUBLICATIONS

Franz et al., "Searching the Web by Voice", Proceedings of the 19th International Conference on Computational Linguistics (COLING), 2002, pp. 1213-1217, XP002390620.

*Primary Examiner* — Paras D Shah

(57) ABSTRACT

A combination and a method are provided. Automatic speech recognition is performed on a received utterance. A meaning of the utterance is determined based, at least in part, on the recognized speech. At least one query is formed based, at least in part, on the determined meaning of the utterance. The at least one query is sent to at least one searching mechanism to search for an address of at least one web page that satisfies the at least one query.

18 Claims, 5 Drawing Sheets

(51) Int. Cl.
*G10L 15/18* (2013.01)
*H04M 3/493* (2006.01)

(58) Field of Classification Search
CPC .. G06F 17/2765; G06F 17/2785; G06F 17/30; G06F 17/30023; G06F 17/30026; G06F 17/30029; G06F 17/30038; G06F 17/30554; G06F 17/30637; H04M 3/493; H04M 3/4936
USPC ....... 704/275, 270, 235, 8, 9, 231, 251, 246; 707/705, 706, 708, 713, 721, 723; 379/88.01, 88.04
See application file for complete search history.

(56) References Cited

U.S. PATENT DOCUMENTS

| | | | |
|---|---|---|---|
| 6,643,622 B2 | 11/2003 | Stuart et al. | |
| 6,665,640 B1 | 12/2003 | Bennett et al. | |
| 7,107,218 B1 | 9/2006 | Preston | |
| 7,366,668 B1 | 4/2008 | Franz et al. | |
| 7,440,968 B1 | 10/2008 | Oztekin et al. | |
| 7,542,902 B2 | 6/2009 | Scahil et al. | |
| 2002/0019737 A1 | 2/2002 | Stuart et al. | |
| 2002/0065857 A1 | 5/2002 | Michalewicz et al. | |
| 2002/0138478 A1 | 9/2002 | Schwartz et al. | |
| 2002/0143548 A1 | 10/2002 | Korall et al. | |
| 2002/0194004 A1 | 12/2002 | Glinski et al. | |
| 2003/0064716 A1* | 4/2003 | Gailey | G10L 15/22 455/414.1 |
| 2003/0115056 A1 | 6/2003 | Gusler et al. | |
| 2003/0220799 A1* | 11/2003 | Kim | G10L 15/22 704/277 |
| 2004/0186730 A1 | 9/2004 | Su et al. | |
| 2004/0190687 A1 | 9/2004 | Baker | |
| 2004/0249636 A1 | 12/2004 | Applebaum et al. | |
| 2005/0086046 A1 | 4/2005 | Bennett | |
| 2005/0091198 A1 | 4/2005 | Dettinger et al. | |
| 2006/0206460 A1 | 9/2006 | Gadkari | |
| 2008/0065371 A1* | 3/2008 | Nakano | G10L 15/22 704/9 |

FOREIGN PATENT DOCUMENTS

| | | |
|---|---|---|
| WO | WO 01/69427 | 9/2001 |
| WO | WO 2004012431 | 2/2004 |

* cited by examiner

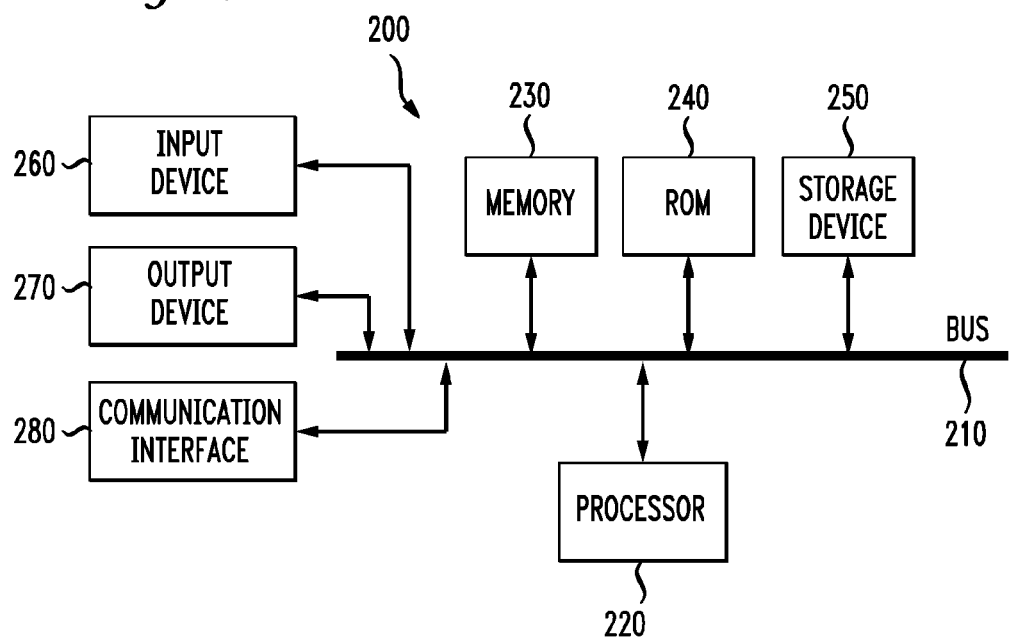
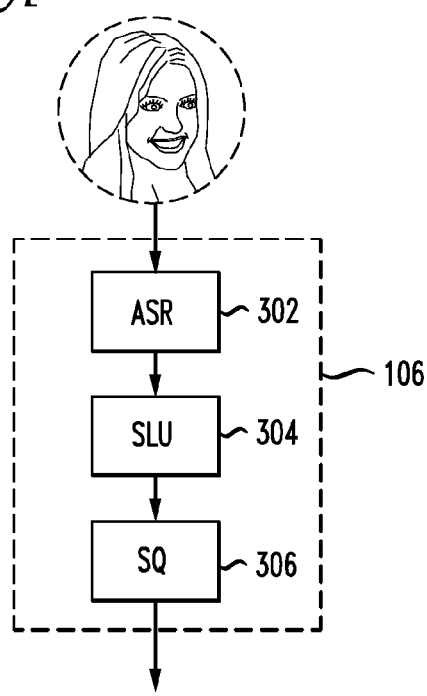

FIG. 4

<u>CIA -The World Factbook</u> -- Bahamas, <u>The</u>
...Legend: Definition Field Listing Rank Order, Introduction,
Bahamas, The, Top of Page. Background ... US. Geography,
Bahamas, The, Top of Page
www.cia.gov/cia/publications/factbook/geos/bf.html −98k−

<u>Bahamas, Tourist Guide</u>
THE COUNTRY OF 700 ISLANDS. Newcomers to The Islands
of Bahamas quickly realize that they have stumbled upon
not one, but many destinations. ...
ww.geographia.com/bahamas/ −10k−

<u>Bahamas, Guide − Travel, Vacation, Business, Real Estate and...</u>
The Bahamas Guide is your independent portal to Bahamas travel,
investment and business in the Islands of Bahamas, with
reviews, hotel information, news ...
www.thebahamasguide.com/ −34k−

<u>Bahamasair − The National Airline of the Bahamas −Your first ...</u>
From: Andros Town, ...
www.bahamasair.com/ −34k−

<u>The Government of theBahamas, − Home</u>
The Government of the Bahamas >Welcome, Bah. asks US
to restore anti-drug funding NASSAU, The Bahamas.The
Bahamas has ...
www.bahamas.gov.bs/ −34k− Mar 19 2005−

<u>Bahamas, Vacation Guide, Bahamas Vacation, Bahamas</u>
Bahamas Vacation Guide, the Bahamas, covers all Bahamas
Islands, a complete Bahamas Tourism Guide, large resource
to plan your Bahamas Vacation. ...
www.bahamasvacationguide.com/ −26k−

<u>bahamas guide,for news, accommodation, hotels, nightlife and ..</u>
free accommodation, dining, shopping activity guide and news
for the Bahamas nassau, new providence, abaco, freeport and
grand bahamas. ...,
www.whatsonbahamas.com/ −16k− Mar 19, 2005

APPARATUS AND METHOD FOR FORMING SEARCH ENGINE QUERIES BASED ON SPOKEN UTTERANCES

PRIORITY INFORMATION

The present application is a continuation of U.S. patent application Ser. No. 11/128,564, filed May 13, 2005, the contents of which is incorporated herein by reference in its entirety.

BACKGROUND OF THE INVENTION

1. Field of the Invention

The present invention relates to speech processing and more specifically to speech recognition driven data retrieval.

2. Introduction

In existing spoken language understanding (SLU) systems, when a call arrives at a call center and a caller makes a request, speech recognition is invoked. Often, the caller requests information, which would require a customer service representative (CSR) to search for information, retrieve the information, and provide the information to the caller. Such requests require more time than many other types of calls, resulting in longer waiting times for callers. If waiting times could be reduced, customer satisfaction and subsequently, customer retention would increase.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

In a first aspect of the invention, a machine-implemented method is provided. Automatic speech recognition is performed on a received utterance. A meaning of the utterance is determined based, at least in part, on the recognized speech. At least one query is formed based, at least in part, on the determined meaning of the utterance. The at least one query is sent to at least one searching mechanism to search for an address of at least one web page that satisfies the at least one query.

In a second aspect of the invention, a combination is provided. The combination includes an automatic speech recognizer, a spoken language understanding component, and at least one search query component. The automatic speech recognizer is configured to receive an utterance and convert the utterance to text. The spoken language understanding component is configured to process the text and produce an indication of a meaning of the utterance based, at least in part, on the text. The at least one search query component is configured to process the indication of the meaning and, based at least in part on the indication of the meaning, produce at least one query for a corresponding searching entity that is configured to search for an address of at least one web site that satisfies the at least one query. Each of the at least one search query component is further configured to send the at least one query to the corresponding searching entity.

In a third aspect of the invention, a machine-readable medium having instructions for at least one processor recorded thereon is provided. The machine-readable medium includes instructions for performing automatic speech recognition on a received utterance, instructions for determining a meaning of the utterance based, at least in part, on the recognized speech, instructions for forming a query based, at least in part, on the determined meaning of the utterance, and instructions for sending the query to a searching mechanism to search for an address of at least one web page that satisfies the query.

In a fourth aspect of the invention, a combination is provided. The combination includes means for converting a received utterance to text, means for processing the text and, based at least in part on the text, producing an indication of a meaning of the utterance, means for processing the indication of the meaning of the utterance and, based at least in part on the indication of the meaning of the utterance, producing a query for a searching entity configured to search for an address of at least one web site that satisfies the query.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates an exemplary processing system which may be used to implement an embodiment consistent with the principles of the invention;

FIGS. 3A-3C illustrate three different exemplary implementations consistent with the principles of the invention;

FIG. 4 shows an exemplary search result; and

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Overview

Figure 1A:
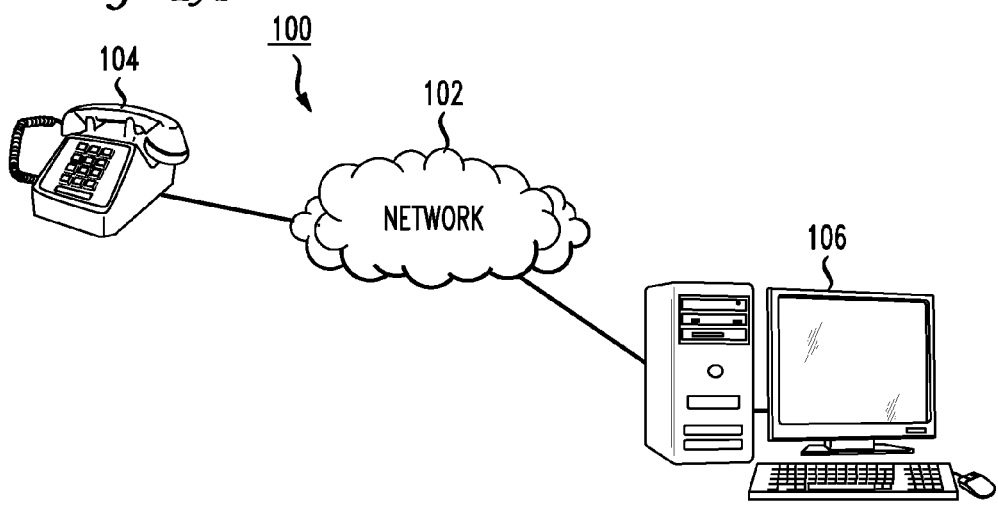
FIGS. 1A and 1B illustrate exemplary systems consistent with the principles of the invention.

FIG. 1A illustrates an exemplary system 100 in which embodiments consistent with the principles of the invention may be implemented. System 100 may include a network 102, a telephone 104, and a customer service representative station 106. Both telephone 104 and station 106 may be connected to network 102 via a physical or wireless connection.

Network 102 may include a network suitable for carrying voice traffic, such as any one of a public switched telephone network (PSTN), a packet switched network, such as, for example, the Internet, or an intranet, an optical network, a wireless network, or any combination of the above networks.

Telephone 104 may be, for example, a conventional telephone, a wireless telephone, such as, for example, a cellular phone or a personal communication system (PCS). Telephone 104 may also be a Voice over Internet Protocol (VoIP) phone that may convert voice to digitized packets for transmission through a packet-switched network and that may convert received digitized packets back into voice for a user.

Station 106 may include a processing device and may receive and send voice signals in a form of digitized packets, such as, for example, VoIP packets. In other implementations, station 106 may instead receive and send conventional telephone signals from and to network 102 over a standard telephone line. Station 106 may be equipped with a speaker and a microphone (not shown) for a customer service representative to communicate with a calling party.

FIG. 1A illustrates an exemplary system. Systems consistent with the principles of the invention may have many telephones and customer service representative stations.

Typically, a caller may place a call to a customer service center via telephone 104. The call may travel through network 102 to customer service representative station 106. Station 106 may translate the received voice message or utterance from telephone 104 to text and may analyze the text to determine a meaning. Upon determining a meaning, station 106 may form a query for a search engine, such as, for example, an Internet search engine or a search engine that may retrieve web pages from a knowledge base of web pages or other resource. The search engine results may be displayed on a monitor of station 106 for the customer service representative. Thus, the customer service representative may be presented with a selection of web pages that may be relevant to a customer's query.

In an alternate embodiment, in addition to station 106 forming a query for an Internet search engine or a search engine that may retrieve web pages, station 106 may form a query to search local and/or remote databases, as well as other data resources and may display search results on the monitor of station 106 for the customer representative.

Further, station 106 of the above embodiments may maintain a local or remote log of resources searched for a particular call, search results, time and date of a search, as well as resources selected from the presented search results by the customer service representative.

Figure 1B:
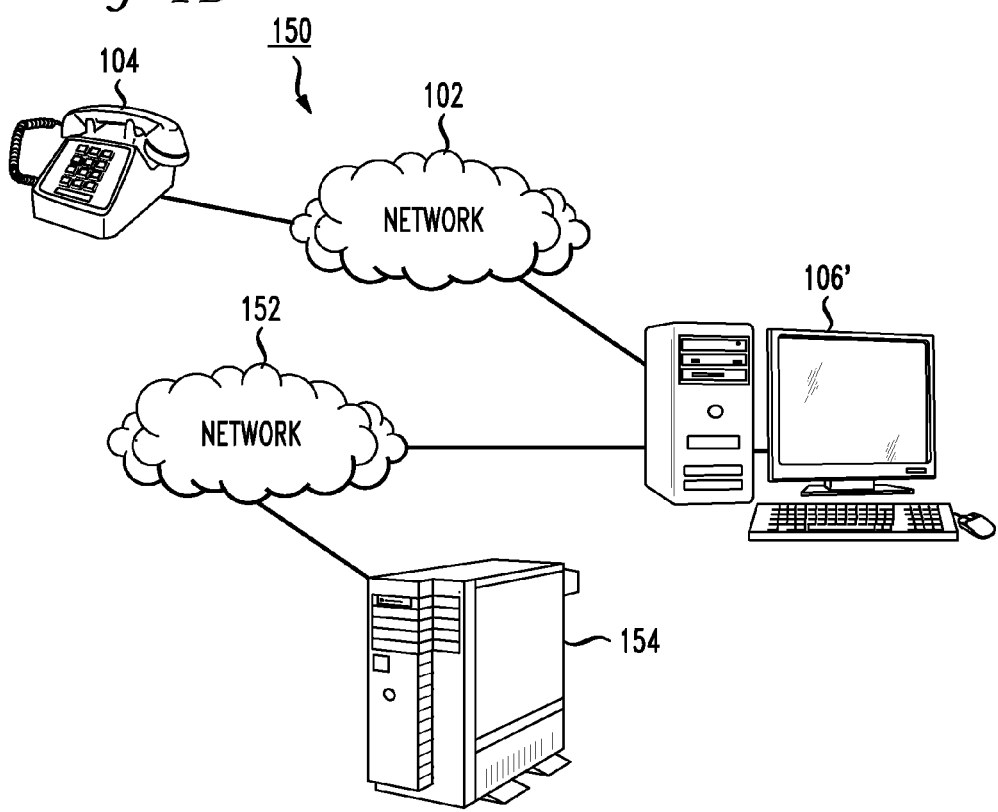

FIG. 1B illustrates an alternative exemplary system 150 consistent with the principles of the invention. Exemplary system 150 may include network 102, telephone 104, customer service representative station 106', network 152, and processing device 154.

Telephone 104 and network 102 may be the same as illustrated by exemplary system 100. Station 106' may be similar to station 106 of FIG. 1A, but instead, may send utterances received from telephone 104 via network 102 to processing device 154 via network 152 for processing.

Network 154 may be, for example, a local area network or other network, in a form of an optical network or a packet-switched network. Utterances may be in digitized form and may be sent to processing device 154 via network 152. Server 154 may convert the received utterances to textual format, may process the text to determine a meaning from the text, and may form a query for a search engine, such as, for example, an Internet search engine or a search engine that may retrieve web pages from a knowledge base of web pages or other resource. Processing device 154 may send the query back to station 106', which further sends the query to the search engine. Thus, the customer service representative may be presented with a selection of web pages that may be relevant to a customer's query while the customer representative is conversing with the customer. The customer representative may then select one or more web pages for displaying.

In an alternate embodiment, in addition to server 154 forming a query for an Internet search engine or a search engine that may retrieve web pages, server 154 may form a query to search local and/or remote databases, as well as other data resources and may send the query back to station 106', which may further send the query to a search engine and/or other searching resource. Station 106' may receive and display search results on the monitor of station 106' for the customer representative.

Similar to station 106, discussed previously, station 106' may maintain a local or remote log of resources searched for a particular call, search results, time and date of a search, as well as resources selected from the presented search results by the customer service representative.

Many other variations of implementations consistent with the principles of the invention are included within the scope of the invention. As an example of another implementation, station 106' may receive an utterance and may convert the utterance to text, which may then be sent to processing device 154 via network 152. Processing device 154 may determine a meaning of the utterances and may construct a message indicating the meaning and may send the message back to station 106'. Station 106' may form a query for one or more search engines and/or other searching resources for local and/or remote web pages, databases, and/or other data resources based on the message and may send the message to the one or more search engines and/or other searching resources. In another variation, station 106' may convert a received utterance to text and may send a message including the text to processing device 154 via network 152. Processing device 154 may then determine a meaning of the utterance, form a query and may send the query back to station 106', which further sends the query to the one or more search engines of local or remote databases and/or other searching resources as discussed above.

FIG. 1B illustrates an exemplary system and may include a number of telephones 104, stations 106', and processing devices 154.

Exemplary Processing System

FIG. 2 illustrates an exemplary processing system 200 in which station 106, station 106', and processing device 154 may be implemented. Thus, system 100 and system 150 may include at least one processing system, such as, for example, exemplary processing system 200. System 200 may include a bus 210, a processor 220, a memory 230, a read only memory (ROM) 240, a storage device 250, an input device 260, an output device 270, and a communication interface 280. Bus 210 may permit communication among the components of system 200.

Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of media, such as, for example, magnetic or optical recording media and its corresponding drive.

Input device 260 may include one or more conventional mechanisms that permit a user to input information to system 200, such as a keyboard, a mouse, a pen, a voice recognition device, etc. Output device 270 may include one or more conventional mechanisms that output information to the user, including a display, a printer, one or more speakers, or a medium, such as a memory, or a magnetic or optical disk and a corresponding disk drive. Communication interface 280 may include any transceiver-like mechanism that enables system 200 to communicate via a network. For example, communication interface 280 may include a modem, or an Ethernet interface for communicating via a local area network (LAN). Alternatively, communication interface 280 may include other mechanisms for communicating with other devices and/or systems via wired, wireless or optical connections.

System 200 may perform such functions in response to processor 220 executing sequences of instructions contained in a computer-readable medium, such as, for example, memory 230, a magnetic disk, or an optical disk. Such instructions may be read into memory 230 from another computer-readable medium, such as storage device 250, or from a separate device via communication interface 280.

FIG. 3A illustrates a functional block diagram of an implementation of station 106 of system 100. Station 106 may include an automatic speech recognizer module (ASR) 302, a spoken language understanding module (SLU) 304, and one or more search query modules (SQ) 306. Station 106 may also include other components that are not shown in order to make the figure more understandable.

ASR module 302 may analyze received speech input or utterances and may provide a transcription of the utterances as output. SLU module 304 may receive the transcribed input and may use a spoken language understanding model to analyze the group of words that are included in the transcribed input to derive a meaning from the input. ASR modules and SLU modules are well known to those of skill in the art. Training of ASR module 302 and SLU module 304 may be performed using existing methods that are known to those of skill in the art. In one implementation, ASR module 302 and SLU module 304 may be trained using application dependent vocabulary, such as, for example, vocabulary pertaining to a travel agency application or other application.

SQ module 304 may receive an indication of a meaning of the transcribed utterance from SLU module 304. For example, if the utterance is "What can you tell me about the Bahamas," SLU module 304 may determine that this is a request for information about a vacation destination and may send, for example, a "Request Info (Bahamas)" command to one or more SQ modules 304. SQ module(s) 304 may then format a query for a search engine, such as, Google, Alta Vista, Webcrawler, Ask Jeeves, or other search engines, and may send the query to the search engine (not shown) via an interface, such as, for example, a standard browser application interface. SQ module(s) 304 may also format one or more queries for local and/or remote databases and/or other data resources and may send the one or more queries to one or more corresponding searching resources. The search engine and/or the one or more searching resources may respond with one or more pages of relevant information, such as links to web pages, databases or other data resources which may be displayed at station 106 to a customer service representative during a call with a user.

Optionally, station 106 may include a logging module (not shown) for logging resources searched for a particular call, search results, time and date of a search, as well as resources selected from the presented search results by the customer service representative.

Figure 3B:
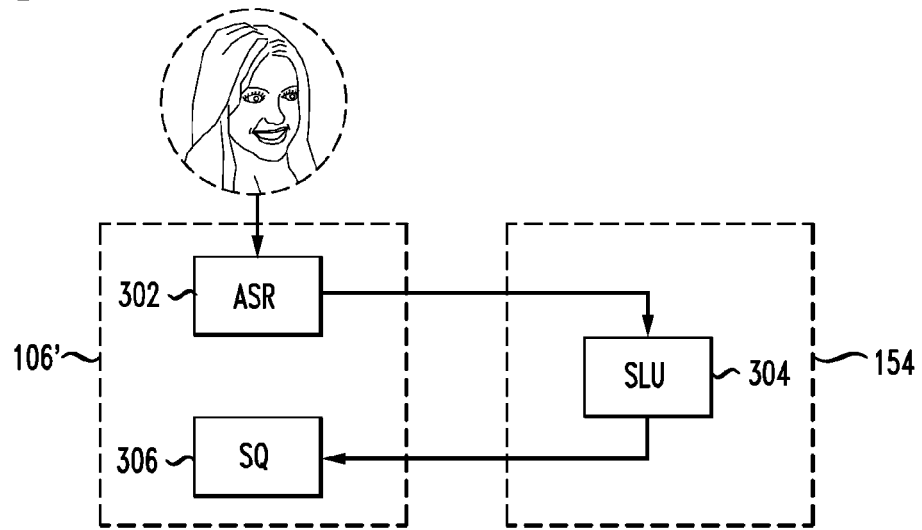

FIG. 3B illustrates a functional block diagram of an implementation of station 106' and processing device 154 of system 150. Station 106' may include ASR module 302 and SQ module 306. Processing device 154 may include SLU module 304.

ASR module 302 may analyze received speech input or utterances and may provide a transcription of the utterances as output. Station 106' may send the transcription to SLU module 304 in processing device 154 via network 152. SLU module 304 may analyze the group of words that are included in the transcribed input to derive a meaning from the input. An indication of the meaning may then be sent from processing device 154 to station 106' where one or more SQ modules 306 may form a query for one or more search engines from the received indication of the meaning and may then send the one or more queries to the one or more search engines via network 102 or network 152. The search engine may return results to a display of station 106'.

Further, one or more SQ modules 306 may form, from the received indication of the meaning, one or queries for one or more other searching resources to search local and/or remote databases, and/or other data resources. The one or more other searching resources may return results to the display of station 106'

Optionally, in this implementation station 106' may include a logging module (not shown) for logging resources searched for a particular call, search results, time and date of a search, as well as resources selected from the presented search results by the customer service representative.

Figure 3C:
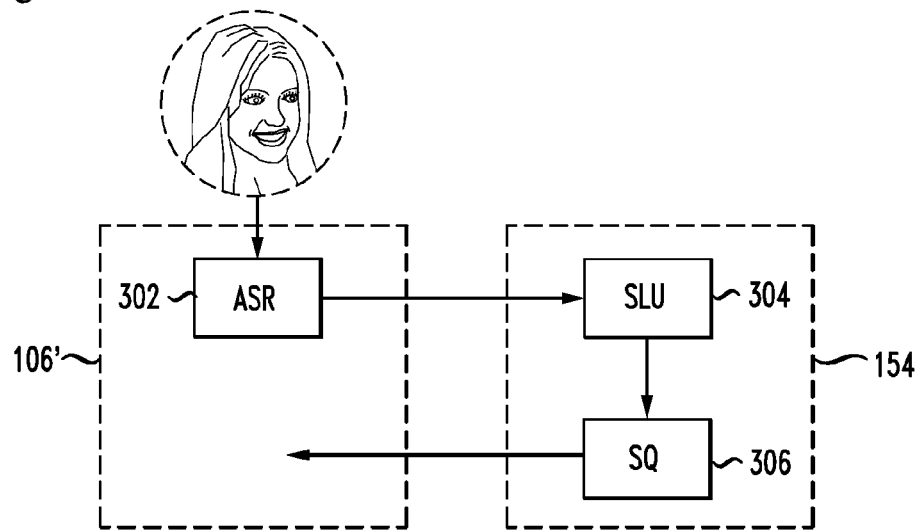

FIG. 3C illustrates a functional block diagram of another implementation of station 106' and processing device 154 of system 150. Station 106' may include ASR module 302. Processing device 154 may include SLU module 304 and one or more SQ modules 306.

ASR module 302 may analyze received speech input or utterances and may provide a transcription of the utterances as output. Station 106' may send the transcription to SLU module 304 in processing device 154 via network 152. SLU module 304 may analyze the group of words that are included in the transcribed input to derive a meaning from the input. An indication of the meaning may then be provided to one or more SQ modules 306, which may form one or more queries for a search engine and/or other searching resources, as described above with respect to FIG. 3B, based on the indicated meaning of the words. SQ module 306 may then send the one or more queries to station 106' via network 152 and station 106' may then send the one or more queries to a search engine and/or the other searching resources via network 102 or network 152.

As described with respect to the implementation of FIG. 3B, the implementation of station 106' of FIG. 3C may optionally include a logging module (not shown) for logging resources searched for a particular call, search results, time and date of a search, as well as resources selected from the presented search results by the customer service representative.

The implementations shown in FIGS. 3A-3C are only exemplary and are not intended to limit the scope of the invention to only those implementations.

In the above-mentioned exemplary implementations, the customer service representative working at station 106 or 106' may receive the results of the search engine and/or the other searching resources, which may be displayed at station 106 or 106'. FIG. 4 illustrates an exemplary display of search results based on a customer's utterance, during a phone call with the customer service representative, regarding the Bahamas. Implementations consistent with the principles of the invention may display the search engine results as one or more links and may display a brief description of each web site or other data resource corresponding to the results, as shown in FIG. 4.

Exemplary Processing

Figure 5:
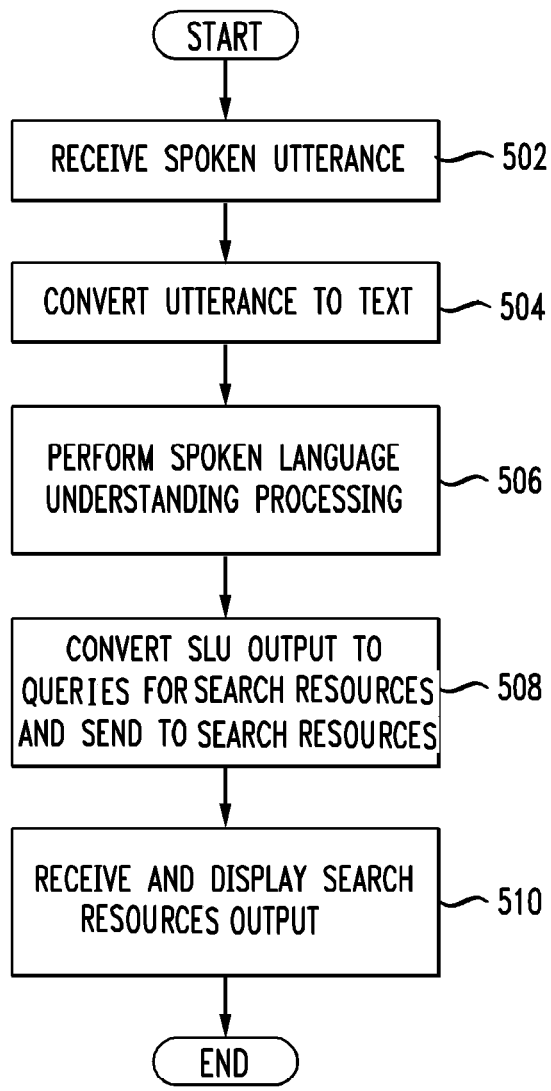
FIG. 5 is a flowchart that illustrates an exemplary process that may be implemented in embodiments of the invention.

FIG. 5 is a flowchart that illustrates exemplary processing in an implementation consistent with the principles of the invention. The process may be performed in any of the implementations illustrated with respect to FIGS. 1A-1B and FIGS. 3A-3C, as well as other implementations. In one implementation, the acts shown in FIG. 5 may be implemented entirely within station 106. In another implementation, the acts of FIG. 5 may be implemented partially in station 106' and partially in processing device 154.

The process may begin with station 106 or 106' receiving a spoken utterance via network 102 (act 502). ASR module 302 may convert the utterance to text (act 504). SLU module 304 may process the text from ASR module 302 and may determine a meaning of the text (act 506). Output from SLU module 304 may be provided to SQ module(s) 306, each of which may form a query based on the determined meaning from SLU module 304 and may send the query to one or more searching resources (act 508). Each of the one or more searching resources may perform a search based on the provided query and may provide the results to station 106 or 106' for display to a customer service representative (act 510).

Implementations consistent with the principles of the invention may log search results, time and date of search, resources searched for a particular call, and resources selected from the presented search results by the customer service representative during the process described in FIG. 5. The logged results may be later viewed by, for example, the customer service representative, computer system administrator, or others.

Although the above implementations describe performing speech recognition on speech from a calling party, other implementations may perform speech recognition on speech from a called party, such as the customer service representative. In yet other implementations, speech recognition may be performed on both speech input from the calling party and speech input from the customer service representative.

Conclusion

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or networked environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in networked computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, hardwired logic may be used in implementations instead of processors, or one or more application specific integrated circuits (ASICs) may be used in implementations consistent with the principles of the invention. Further, implementations consistent with the principles of the invention may perform more or fewer acts than as described in FIG. 5, or may implement acts in a different order than as shown in FIG. 5. Accordingly, the appended claims and their legal equivalents should only define the invention, rather than any specific examples given.

We claim as our invention:

1. A method, comprising:
    performing, via a processor, automatic speech recognition on a first utterance comprising a first group of words from a first party in a conversation, to yield first recognized speech;
    determining a meaning of the first group of words via a spoken language understanding unit, wherein determining the meaning is based on the first recognized speech;
    performing automatic speech recognition on a second utterance comprising a second group of words from a second party to yield second recognized speech;
    forming a query based on the meaning of the first group of words and a meaning of the second group of words as determined by the spoken language understanding unit and based on the second recognized speech;

sending the query to a web-based search engine to search for a web page that satisfies the query;

sending an address of the web page to a device associated with the second party in the conversation;

logging a time and date of the query, search results obtained by the web-based search engine, and a selection of the search results made by the second party, to yield a log; and presenting the log for analysis.

2. The method of claim 1, wherein the log is presented to the second party.

3. The method of claim 2, wherein the second party is a customer service representative.

4. The method of claim 1, wherein the conversation is ongoing during the automatic speech recognition, the determining of the meaning, the forming of the query, and the sending of the query.

5. The method of claim 1, wherein determining of the meaning of the utterance further comprises performing a spoken language understanding analysis of the utterance.

6. The method of claim 1, wherein the web-based search engine comprises a knowledge base of web pages.

7. A system comprising:
a processor; and
a computer-readable storage medium having instructions stored which, when executed by the processor, result in the processor performing operations comprising:
performing, via a processor, automatic speech recognition on a first utterance comprising a first group of words from a first party in a conversation, to yield recognized speech;
determining a meaning of the first group of words via a spoken language understanding unit, wherein determining the meaning is based on the recognized speech;
performing automatic speech recognition on a second utterance comprising a second group of words from a second party to yield second recognized speech;
forming a query based on the meaning of the first group of words and a meaning of the second group of words as determined by the spoken language understanding unit and based on the second recognized speech;
sending the query to a web-based search engine to search for a web page that satisfies the query;
sending an address of the web page to a device associated with the second party in the conversation;
logging a time and date of the query, search results obtained by the web-based search engine, and a selection of the search results made by the second party, to yield a log; and
presenting the log for analysis.

8. The system of claim 7, wherein the log is presented to the second party.

9. The system of claim 8, wherein the second party is a customer service representative.

10. The system of claim 7, wherein the conversation is ongoing during the automatic speech recognition, the determining of the meaning, the forming of the query, and the sending of the query.

11. The system of claim 7, wherein determining of the meaning of the utterance further comprises performing a spoken language understanding analysis of the utterance.

12. The system of claim 7, wherein the web-based search engine comprises a knowledge base of web pages.

13. A computer-readable storage device having instructions stored which, when executed by a computing device, result in the computing device performing operations comprising:
performing, via a processor, automatic speech recognition on a first utterance comprising a first group of words from a first party in a conversation, to yield recognized speech;
determining a meaning of the first group of words via a spoken language understanding unit, wherein determining the meaning is based on the recognized speech;
performing automatic speech recognition on a second utterance comprising a second group of words from a second party to yield second recognized speech;
forming a query based on the meaning of the first group of words and a meaning of the second group of words as determined by the spoken language understanding unit and based on the second recognized speech;
sending the query to a web-based search engine to search for a web page that satisfies the query;
sending an address of the web page to a device associated with the second party in the conversation;
logging a time and date of the query, search results obtained by the web-based search engine, and a selection of the search results made by the second party, to yield a log; and
presenting the log for analysis.

14. The computer-readable storage device of claim 13, wherein the log is presented to the second party.

15. The computer-readable storage device of claim 14, wherein the second party is a customer service representative.

16. The computer-readable storage device of claim 13, wherein the conversation is ongoing during the automatic speech recognition, the determining of the meaning, the forming of the query, and the sending of the query.

17. The computer-readable storage device of claim 13, wherein determining of the meaning of the utterance further comprises performing a spoken language understanding analysis of the utterance.

18. The computer-readable storage device of claim 13, wherein the web-based search engine comprises a knowledge base of web pages.

* * * * *